United States Patent
Bali et al.

(10) Patent No.: US 7,493,371 B1
(45) Date of Patent: Feb. 17, 2009

(54) USING A CLIENT-SERVER CONNECTION PROTOCOL TO ESTABLISH A PEER-TO-PEER CONNECTION

(75) Inventors: Naveen Bali, Cary, NC (US); Abhijeet Gole, Campbell, CA (US); Ravi K. Budhia, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 951 days.

(21) Appl. No.: 10/816,336

(22) Filed: Mar. 31, 2004

(51) Int. Cl.
*G06F 15/16* (2006.01)

(52) U.S. Cl. .................. 709/209; 709/203; 709/228

(58) Field of Classification Search ............... 709/203, 709/208, 209
See application file for complete search history.

(56) References Cited

U.S. PATENT DOCUMENTS

| | | | | |
|---|---|---|---|---|
| 6,131,121 | A * | 10/2000 | Mattaway et al. | 709/227 |
| 6,526,434 | B1 * | 2/2003 | Carlson et al. | 709/203 |
| 7,006,479 | B1 * | 2/2006 | Joo et al. | 370/338 |
| 7,213,044 | B2 * | 5/2007 | Tjong et al. | 709/200 |
| 2003/0225831 | A1 * | 12/2003 | Asai | 709/203 |
| 2004/0044727 | A1 * | 3/2004 | Abdelaziz et al. | 709/203 |
| 2004/0093372 | A1 * | 5/2004 | Chen et al. | 709/203 |
| 2004/0117438 | A1 * | 6/2004 | Considine et al. | 709/203 |
| 2004/0133634 | A1 * | 7/2004 | Luke et al. | 709/203 |
| 2004/0243714 | A1 * | 12/2004 | Wynn et al. | 709/231 |
| 2005/0005014 | A1 * | 1/2005 | Holmes et al. | 709/227 |
| 2005/0015437 | A1 * | 1/2005 | Strait | 709/203 |
| 2005/0086387 | A1 * | 4/2005 | Clark | 709/249 |
| 2005/0091401 | A1 * | 4/2005 | Keohane et al. | 709/240 |
| 2005/0235031 | A1 * | 10/2005 | Schneider et al. | 709/203 |
| 2006/0167954 | A1 * | 7/2006 | Fujiki et al. | 707/201 |
| 2008/0016142 | A1 * | 1/2008 | Schneider | 709/203 |

OTHER PUBLICATIONS

Fibre Channel Virtual Interface (FC-VI) Rev. 1.6, Jul. 5, 2000.*

* cited by examiner

*Primary Examiner*—Paul Kang
*Assistant Examiner*—Greg Bengzon
(74) *Attorney, Agent, or Firm*—Blakely, Sokoloff, Taylor & Zafman LLP

(57) ABSTRACT

In one embodiment the invention provides a method for establishing a point-to-point link between two peer nodes in a communications network. According to the method, one of the client and server roles is assigned to each of the two nodes based on a rule. Thereafter, the point-to-point link is established between the two nodes based on a predefined client-server connection protocol.

18 Claims, 6 Drawing Sheets

USING A CLIENT-SERVER CONNECTION PROTOCOL TO ESTABLISH A PEER-TO-PEER CONNECTION

FIELD OF THE INVENTION

Embodiments of the invention relate to establishing a peer-to-peer connection between two nodes in a communications network.

BACKGROUND

Communications protocols may define connection methods to be used when establishing a connection between two nodes in a communications network. The connection method may be based on the relationship between the two nodes being connected. For example, a communications protocol may define a client-server connection method to be used if the two nodes being connected have a client-server relationship, and a peer-to-peer connection method to be used if the two nodes being connected have a peer-to-peer relationship.

In some cases because the client-server connection method may be simpler, it is desirable to use the client-server connection method even if the two nodes being connected have a peer-to-peer relationship.

As an example of a communications protocol that defines different connection methods based on the relationship between the nodes being connected, consider the Virtual Interface (VI) protocol. The VI protocol allows nodes in a network to communicate through a Virtual Interface, thereby effectively bypassing calls to an Operating System (OS) kernel which has the advantage of eliminating the overhead due to OS kernel calls.

The VI protocol can run over any interconnect that supports the VI protocol. For example, the VI protocol may run over the Fibre Channel (FC) interconnect, or the Infiniband interconnect. The VI protocol defines two types of VI connection methods, namely the client-server, and the peer-to-peer connection methods. When the end points in a VI connection have a peer relationship, it is natural to set up the VI connection using the peer-to-peer method. However, the client-server method is much simpler to implement than the peer-to-peer method because the client-server connection method has a simpler state machine.

SUMMARY OF THE INVENTION

In one embodiment the invention provides a method for establishing a point-to-point link between two peer nodes in a communications network. According to the method, one of the client and server role is assigned to each of the two nodes based on a rule. Thereafter, the point-to-point link is established between the two nodes based on a predefined client-server connection protocol.

DETAILED DESCRIPTION

Embodiments of the invention disclose a technique for establishing a point-to-point link between two peer nodes in a communications network using a client-server connection protocol, instead of a peer-to-peer connection protocol. Embodiments of the present invention may be used to establish a peer-to-peer connection between two peer FC-VI ports using the client-server connection method/protocol defined in the VI specification instead of the peer-to-per connection method/protocol defined in the VI specification. Advantageously, establishing the peer-to-peer connection between the to FC-VI ports is simplified since the client-server connection protocol defined in the VI specification is simpler than the peer-to-peer connection protocol defined in the VI specification. Other advantages of the techniques disclosed herein will be apparent from the detailed description below.

Figure 1:
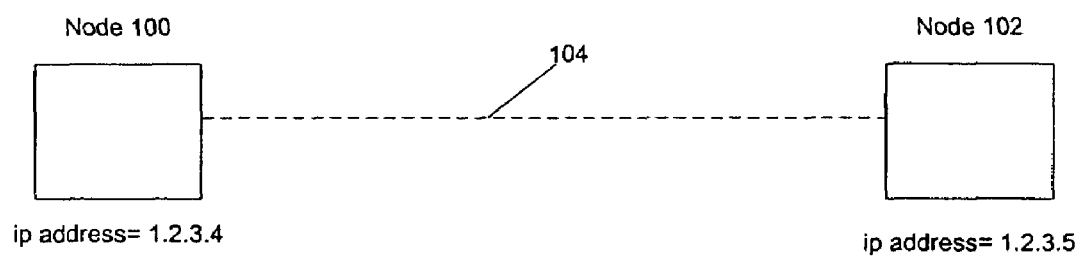
FIG. 1 shows a communications network comprising two peer nodes between which a point-to-point link is to be established.

Referring to FIG. 1 of the drawings, reference numeral 100, 102 generally indicates two peer nodes in a communications network, between which a point-to-point link 104 is to be established. Each peer node 100, 102 supports a communication protocol that defines a peer-to-peer connection method and a client-server connection method. The peer-to-peer connection method is to be used since the nodes 100, 102 have a peer-to-peer relationship. The client-server connection method is ordinarily not an option in this case since it requires the two nodes being connected to have a client-server relationship. To facilitate discussion of embodiments of the invention, assume that the node 100 has an Internet Protocol (IP) address of 1.2.3.4, and the peer node 102 has an IP address of 1.2.3.5.

Figure 2:
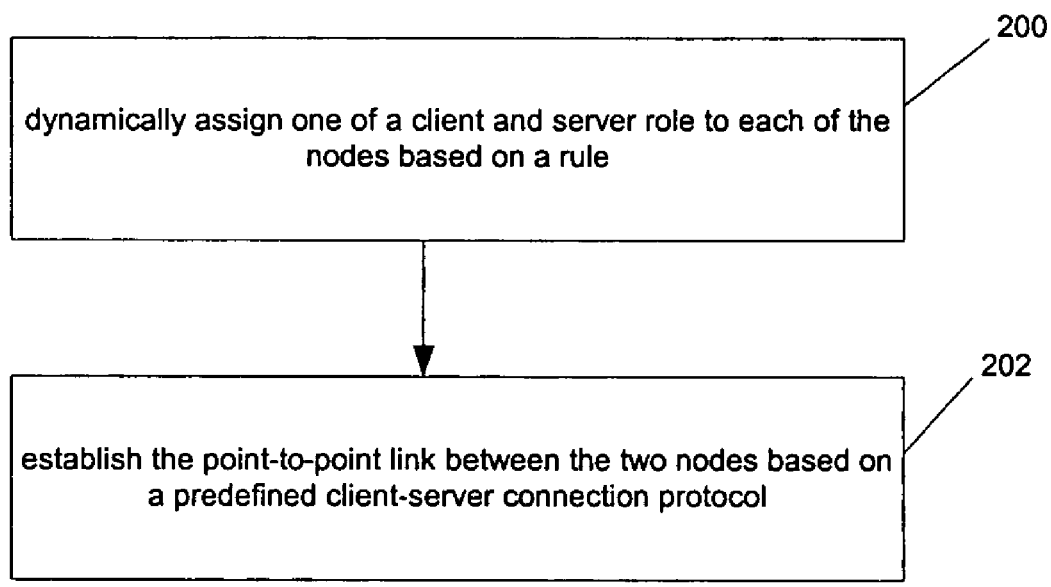
FIG. 2 shows a flowchart of operations performed when establishing a point-to-point link between the two peer nodes of FIG. 1, in accordance with one embodiment of the invention.

FIG. 2 of the drawings shows a flowchart of operations performed when establishing a point-to-point link between the two peer nodes 100, 102 shown in FIG. 1 of the drawings, in accordance with one embodiment of the invention. Referring to FIG. 2, at block 200, one of a client and a server role is dynamically assigned to each of the peer nodes 100, 102 based on a rule. According to embodiments of the invention, the rule relies on system level knowledge to assign the client and the server roles. Embodiments of the invention may include predefining the rule. The rule may assign the client and server roles based on a numeric value of the network address of the two nodes. For example, in one embodiment, the rule may specify that the node 100 with a smaller network address gets assigned the role of the client, whereas the node 102 with the larger network address gets assigned the role of the server. Thus, referring to FIG. 1, the node with the network address 1.2.3.4 will get assigned the role of the client, whereas the node with the network address 1.2.3.5 will get assigned the role of the server. Thereafter, at block 202 a point-to-point link is established between the two nodes based on a predefined client-server connection protocol/method.

Figure 3:
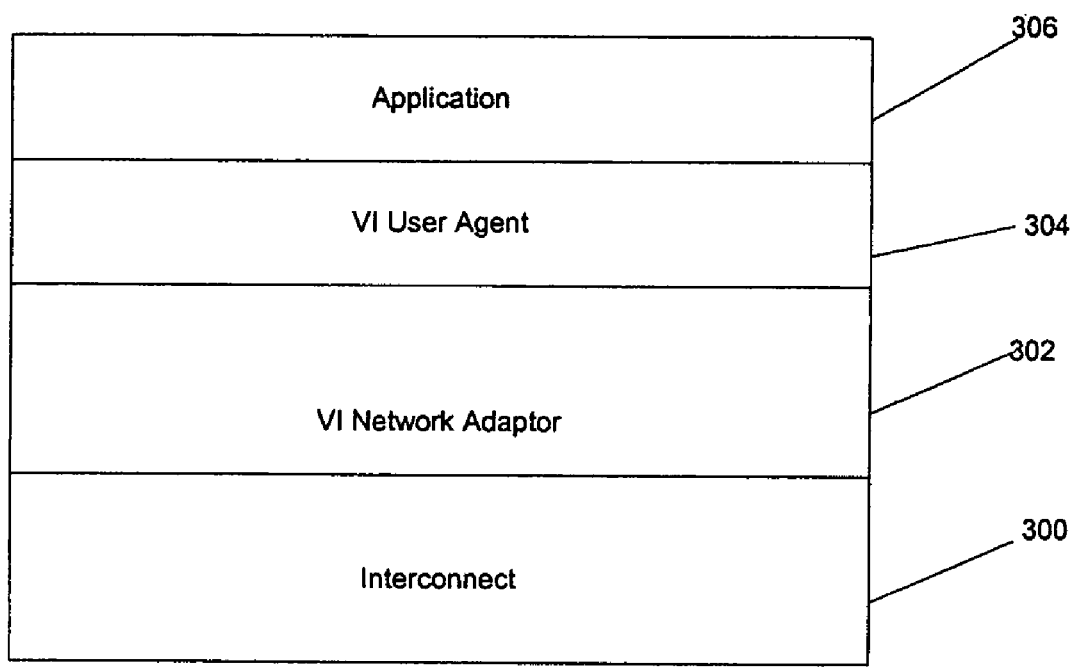
FIG. 3 shows a generalized architecture for the nodes of FIG. 1, when the nodes define FC-VI ports.

In one embodiment of the invention, the nodes 100, 102 may each define an FC-VI port each having the generalized architecture shown in FIG. 3 of the drawings. Referring to FIG. 3, it will be seen that each node 100, 102 includes an interconnect module 300 which implements an interconnect to support the VI protocol. For example, the interconnect module may support the FC, or the Infiniband protocols. A VI network adaptor 302 implements VI functionality in conjunction with a VI User Interface (UI) 304 that is disposed between the VI network adaptor 302, and an application 306 that uses the VI protocol.

Figure 4:
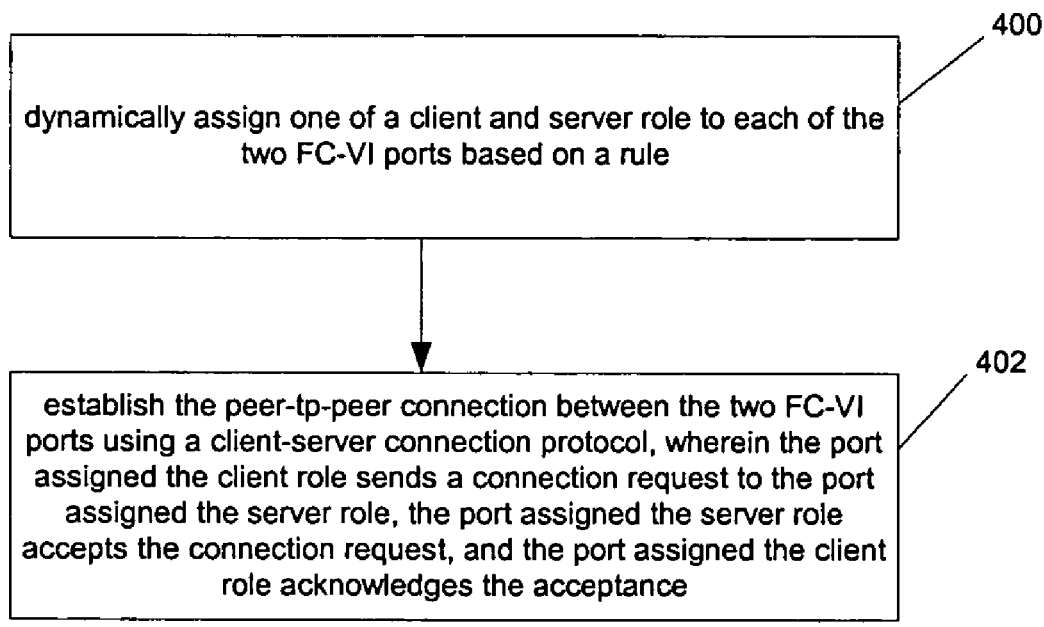
FIG. 4 shows a flowchart of operations performed when establishing a peer-to-peer connection between two peer FC-VI ports, in accordance with one embodiment of the invention.

Referring now to FIG. 4 of the drawings, there is shown a flowchart of operations performed when establishing a peer-to-peer connection between the two peer FC-VI ports shown in FIG. 1 of the drawings. Referring to FIG. 4, at block 400 one of a client and server role is dynamically assigned to each of the two FC-VI ports 100, 102. Thereafter at block 402 a peer-to-peer connection is established between the two peer FC-VI ports 100, 102 in accordance with the client-server connection protocol defined in the VI specification, wherein the port assigned the client role sends a connection request to the port assigned the server role, the port assigned the server role accepts the connection request, and the port assigned the client role acknowledges the acceptance of the request. In one embodiment, dynamically assigning the client and server roles comprises performing a comparison of the network addresses of the two peer FC-VI ports 100, 102, and assigning the client and server roles based on the comparison. For example, the FC-VI port with the numerically higher value may be assigned the role of the server, whereas the FC-VI port with the numerically lower value may be assigned the role of the client.

Figure 5:
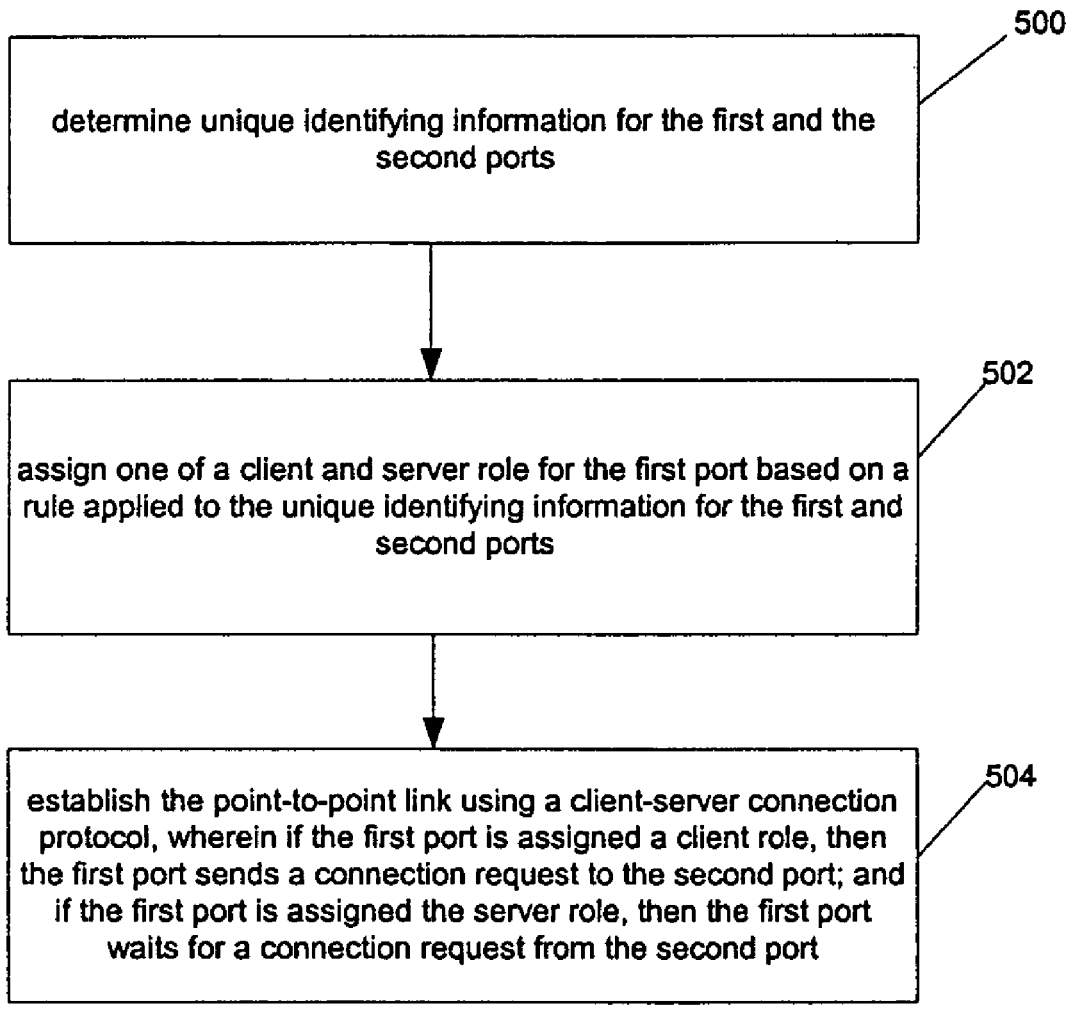
FIG. 5 shows a flowchart of operations performed by a first port in a communications network when establishing a point-to-point link with a second port in the communications network, in accordance with one embodiment of the invention.

Embodiments of the present invention relate specifically to operations performed at each of the nodes/ports 100, 102 shown in FIG. 1 of the drawings. Accordingly, FIG. 5 of the drawings shows a flowchart of operations performed by a first port (i.e., the node 100) in the communications network shown in FIG. 1 to establish a point-to-point link with a second port in the communications network (i.e., the port 102 in FIG. 1 of the drawings), which second port is a peer of the first port. Referring to FIG. 5, at block 500, the first port (node 100), determines unique identifying information for the first and second ports. For example, in one embodiment this unique identifying information may comprise the network addresses of the first and second ports, respectively. At block 502, the first port (node 100) assigns one of a client and server role for itself based on a rule applied to the unique identifying information. For example, in one embodiment the rule may specify that the port with the numerically higher network address may be assigned the server role, whereas the port with the numerically lower network address may be assigned the client role. Thereafter, at block 502, the first port (node 100) establishes a point-to-point link using a client-server connection protocol which operates as follows. If the first port (node 100) is assigned a client role, then the first port sends a connection request to the second port (node 102). Alternatively, if the first port (node 100) is assigned the server role, then the first port waits for a connection request from the second port (node 102).

It will be appreciated that by performing the operations shown in FIG. 5, at the first port (node 100), and at the second port (node 102) the result is that one of the first port and the second port will be assigned the server role, and one of the first port and the second port will be assigned the client role. Thus, the port assigned the client role will wait for the other port to send a connection request, whereas the port assigned server role will send a connection request to the other port.

Figure 6:
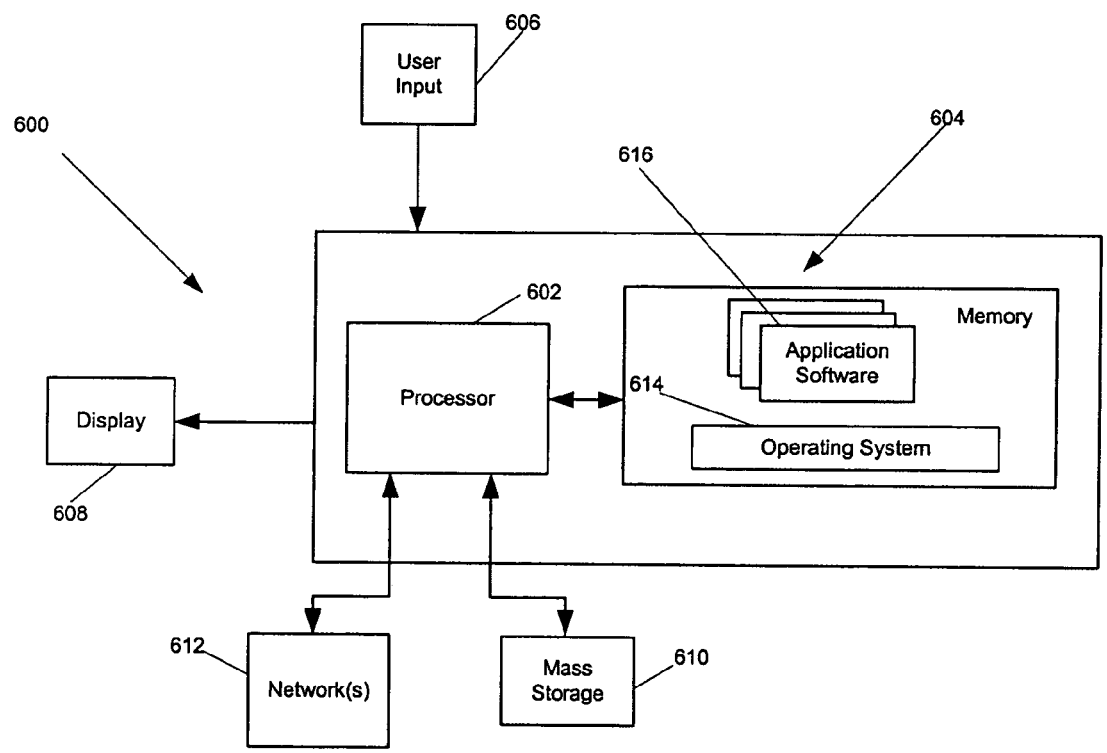
FIG. 6 shows a high level block diagram of hardware that may be used to implement the nodes of FIG. 1, in accordance with one embodiment of the invention.

Referring to FIG. 6 of the drawings, reference numeral 600 generally indicates hardware that may be used to implement the nodes 100, 102 in accordance with one embodiment. The hardware 600 typically includes at least one processor 602 coupled to a memory 604. The processor 602 may represent one or more processors (e.g., microprocessors), and the memory 604 may represent random access memory (RAM) devices comprising a main storage of the hardware 600, as well as any supplemental levels of memory e.g., cache memories, non-volatile or back-up memories (e.g. programmable or flash memories), read-only memories, etc. In addition, the memory 604 may be considered to include memory storage physically located elsewhere in the hardware 600, e.g. any cache memory in the processor 602, as well as any storage capacity used as a virtual memory, e.g., as stored on a mass storage device 610.

The hardware 600 also typically receives a number of inputs and outputs for communicating information externally. For interface with a user or operator, the hardware 600 may include one or more user input devices 606 (e.g., a keyboard, a mouse, etc.) and a display 608 (e.g., a Cathode Ray Tube (CRT) monitor, a Liquid Crystal Display (LCD) panel).

For additional storage, the hardware 600 may also include one or more mass storage devices 610, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 400 may include an interface with one or more networks 612 (e.g., a local area network (LAN), a wide area network (WAN), a wireless network, and/or the Internet among others) to permit the communication of information with other computers coupled to the networks. It should be appreciated that the hardware 600 typically includes suitable analog and/or digital interfaces between the processor 602 and each of the components 604, 606, 608 and 612 as is well known in the art.

The hardware 600 operates under the control of an operating system 614, and executes various computer software applications 616, components, programs, objects, modules, etc. (e.g. a program or module which performs operations described above). Moreover, various applications, components, programs, objects, etc. may also execute on one or more processors in another computer coupled to the hardware 600 via a network 612, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modifications and changes can be made to these embodiments without departing from the broader spirit of the invention as set forth in the claims. Accordingly, the specification and drawings are to be regarded in an illustrative sense rather than in a restrictive sense.

What is claimed is:

1. A method for establishing a point-to-point link between two peer nodes in a communications network, the method comprising:
    dynamically assigning one of a client and server role to each of the two nodes by applying a rule to two identifiers corresponding to the two nodes, each node identifying the other node with one of the two identifiers;
    establishing an initial link between the two nodes based on the roles assigned to the nodes, the initial link based on a predefined client-server connection protocol;
    establishing the point-to-point link between the two nodes based only on the initial link, wherein the point-to-point link is established without using a point-to-point connection protocol; and
    closing, in response to establishing the point-to-point link, the initial link.

2. The method of claim 1, further comprising predefining the rule, wherein the rule assigns the client and server roles based on a numeric value of a network address of the two nodes.

3. A method for establishing a peer-to-peer connection between two peer Fibre Channel Virtual Interface (FC-VI) ports, the method comprising:
    dynamically assigning one of a client and server role to each of the two FC-VI ports, each of the two ports identifying the other port with an identifier and the assigning based on the identifier;
    establishing an initial connection between the two FC-VI ports based on the roles assigned to the ports based on a client-server connection protocol;
    establishing the peer-to-peer connection between the two peer FC-VI ports using only the initial connection, wherein the port assigned the client role sends a peer-to-peer connection request to the port assigned the server role, the port assigned the server role accepts the peer-to-peer connection request, and the port assigned the client role acknowledges the acceptance and wherein the peer-to-peer link is established without using a peer-to-peer connection protocol;
    closing, in response to establishing the peer-to-peer connection, the initial connection.

4. The method of claim 3, wherein dynamically assigning the client and server roles comprises performing a comparison of network addresses for the two peer FC-VI ports; and assigning the client and server roles based on the comparison.

5. A method for a first port in a communications network to establish a point-to-point link with a second port in the communications network, the second port being configured as a peer of the first port, the method comprising:
    determining unique identifying information for a first peer node connected through a first port to a second peer node through a second port over a communications network;
    assigning one of a client and server role for the first port based on a rule applied to the unique identifying information for the first and second ports, the assigning signaling to the second port a role assignment; and
    establishing the point-to-point link using a client-server connection protocol, wherein if the first port is assigned a client role, then the first port sends a point-to-point connection request to the second port; and if the first port is assigned the server role, then the first port receives a point-to-point connection request from the second port in response to the assigning and wherein the point-to-point link is established without using a point-to-point connection protocol.

6. The method of claim 5, wherein the rule defines the client and server roles based on a comparison of values associated with the unique identifying information for the first and second ports.

7. A computer readable storage medium, having stored thereon a sequence of instructions which when executed by a processor, cause the processor to perform a method, the method comprising:
    dynamically assigning one of a client and server role to each of the two nodes by applying a rule to two identifiers corresponding to the two nodes, each node identifying the other node with one of the two identifiers;
    establishing an initial link between the two nodes based on the roles assigned to the nodes, the initial link based on a predefined client-server connection protocol;
    establishing the point-to-point link between the two nodes based only on the initial link, wherein the point-to-point link is established without using a point-to-point connection protocol; and
    closing, in response to establishing the point-to-point link, the initial link.

8. The computer readable storage medium of claim 7, wherein the rule assigns the client and server roles based on a numeric value of a network address of the two nodes.

9. The computer readable storage medium having stored thereon a sequence of instructions which when executed by a processor, cause the processor to perform a method for establishing a peer-to-peer connection between two peer Fibre Channel Virtual Interface (FC-VI) ports, the method comprising:
    dynamically assigning one of a client and server role to each of the two FC-VI ports, each of the two ports identifying the other port with an identifier and the assigning based on the identifier;
    establishing an initial connection between the two FC-VI ports based on the roles assigned to the ports based on a client-server connection protocol;
    establishing the peer-to-peer connection between the two peer FC-VI ports using only the initial connection, wherein the port assigned the client role sends a peer-to-peer connection request to the port assigned the server role, the port assigned the server role accepts the peer-to-peer connection request, and the port assigned the client role acknowledges the acceptance and wherein the peer-to-peer link is established without using a peer-to-peer connection protocol;
    closing, in response to establishing the peer-to-peer connection, the initial connection.

10. The computer readable storage medium of claim 9, wherein dynamically assigning the client and server roles comprises performing a comparison of network addresses for the two peer FC-VI ports; and assigning the client and server roles based on the comparison.

11. The computer readable storage medium having stored thereon a sequence of instructions which when executed by a processor, cause the processor to perform a method, the method comprising:
    determining unique identifying information for a first peer node connected through a first port to a second peer node through a second port over a communications network;
    assigning one of a client and server role for the first port based on a rule applied to the unique identifying information for the first and second ports, the assigning signaling to the second port a role assignment; and
    establishing the point-to-point link using a client-server connection protocol, wherein if the first port is assigned a client role, then the first port sends a point-to-point connection request to the second port; and if the first port is assigned the server role, then the first port receives a point-to-point connection is established without using a point-to-point connection protocol.

12. The computer readable storage medium of claim 11, wherein the rule defines the client and server roles based on a comparison of values associated with the unique identifying information for the first and second ports.

13. A storage device, comprising:
    a processor; and
    a memory coupled to the processor, the memory storing instructions which when executed by the processor, cause the storage device to perform a method for establishing a point-to-point link between two peer nodes in a communications network, the method comprising:
    dynamically assigning one of a client and server role to each of the two nodes by applying a rule to two identifiers corresponding to the two nodes, each node identifying the other node with one of the two identifiers;
    establishing an initial link between the two nodes based on the roles assigned to the nodes, the initial link based on a predefined client-server connection protocol;
    establishing the point-to-point link between the two nodes based only on a the initial link, wherein the point-to-point connection is established without using a point-to-point connection protocol; and
    closing, in response to establishing the point-to-point link, the initial link.

14. The storage device of claim 13, wherein the rule assigns the client and server roles based on a numeric value of a network address of the two nodes.

15. A storage device, comprising:
    a processor; and
    a memory coupled to the processor, the memory storing instructions which when executed by the processor, cause the storage device to perform a method for establishing a peer-to-peer connection between two peer Fibre Channel Virtual Interface (FC-VI) ports, the method comprising:
    dynamically assigning one of a client and server role to each of the two FC-VI ports, each of the two ports identifying the other port with an identifier and the assigning based on the identifier;
    establishing an initial connection between the two FC-VI ports based on the roles assigned to the ports based on a client-server connection protocol;
    establishing the peer-to-peer connection between the two peer FC-VI ports using only the initial connection, wherein the port assigned the client roles sends a peer-to-peer connection request to the port assigned the server role, the port assigned the server role accepts the peer-to-peer connection request, and the port assigned the client role acknowledges the acceptance and wherein the peer-to-peer connection is established without using a peer-to-peer connection protocol;
    closing, in response to establishing the point-to-point connection, the initial connection.

16. The storage device of claim 15, wherein dynamically assigning the client and server roles comprises performing a comparison of network addresses for the two peer FC-VI ports; and assigning the client and server roles based on the comparison.

17. A storage device, comprising:
    a processor; and
    a memory coupled to the processor, the memory storing instructions which when executed by the processor, cause the storage device to perform a method for a first port in a communications network to establish a point-to-point link with a second port in the communications network, the second port being configured as a peer of the first port, the method comprising:
    determining unique identifying information for a first peer node connected through a first port to a second peer node through a second port over a communications network;
    assigning one of a client and server role for the first port based on a rule applied to the unique identifying information for the first and second ports, the assigning signaling to the second port a role assignment; and
    establishing the point-to-point link using a client-server connection protocol, wherein if the first port is assigned a client role, then the first port sends a point-to-point connection request to the second port; and if the first port is assigned the server role, then the first port receives a point-to-point connection request from the second port in response to the assigning and wherein the point-to-point connection is established without using a point-to-point connection protocol.

18. The storage device of claim 17, wherein the rule defines the client and server roles based on a comparison of values associated with the unique identifying information for the first and second ports.

* * * * *